United States Patent [19]
Ikeda et al.

[11] Patent Number: 6,084,730
[45] Date of Patent: Jul. 4, 2000

[54] INFORMATION TRANSMISSION SYSTEM USING DATA COMPRESSION AND/OR ERROR DETECTION

[75] Inventors: Shingo Ikeda, Kawasaki; Motokazu Kashida, Musashino; Toshihiro Yagisawa; Masahide Hasegawa, both of Yokohama; Mitsugu Tanaka, Tokyo, all of Japan

[73] Assignee: Canon Kabushiki Kaisha, Japan

[21] Appl. No.: 08/468,571

[22] Filed: Jun. 6, 1995

Related U.S. Application Data

[63] Continuation of application No. 08/247,115, May 20, 1994, abandoned, which is a continuation of application No. 07/970,225, Nov. 2, 1992, abandoned, which is a continuation of application No. 07/386,714, Jul. 31, 1989, abandoned.

[30] Foreign Application Priority Data

| Aug. 5, 1988 | [JP] | Japan | 63-194358 |
| Aug. 5, 1988 | [JP] | Japan | 63-194359 |
| Aug. 5, 1988 | [JP] | Japan | 63-194360 |
| Jan. 14, 1989 | [JP] | Japan | 1-006499 |

[51] Int. Cl.[7] ................................................ G11B 5/00
[52] U.S. Cl. ........................ 360/32; 360/61; 360/8; 386/112; 348/385; 714/746; 714/771
[58] Field of Search ........................ 360/32, 33.1, 48, 360/61, 39, 62, 8, 9.1; 358/141, 133, 310, 335

[56] References Cited

U.S. PATENT DOCUMENTS

| 3,825,689 | 7/1974 | Verhoeven ........................ 379/13 |
| 3,836,957 | 9/1974 | Duke et al. ...................... 340/146.1 |
| 4,206,476 | 6/1980 | Hashimoto ....................... 360/32 X |
| 4,329,708 | 5/1982 | Yamamoto et al. ............... 348/617 |
| 4,455,655 | 6/1984 | Galen et al. ...................... 371/38 |
| 4,551,840 | 11/1985 | Fujii et al. ....................... 371/38 |
| 4,748,511 | 5/1988 | Nichols et al. .................. 358/256 |
| 4,754,483 | 6/1988 | Weaver ............................ 360/8 X |
| 4,876,737 | 10/1989 | Woodworth et al. .............. 455/12 |
| 4,914,527 | 4/1990 | Asai et al. ....................... 360/32 X |
| 5,070,503 | 12/1991 | Shikakura ........................ 371/37.1 |

FOREIGN PATENT DOCUMENTS

| 0029327 | 5/1981 | European Pat. Off. . |
| 0202009 | 11/1986 | European Pat. Off. ......... H04N 5/76 |
| 0229353 | 7/1987 | European Pat. Off. . |
| 0233783 | 8/1987 | European Pat. Off. . |
| 0269746 | 6/1988 | European Pat. Off. . |
| 3334934 | 4/1985 | Germany . |
| 3719496 | 12/1988 | Germany ........................ G11B 5/09 |
| 2190233 | 11/1987 | United Kingdom . |

OTHER PUBLICATIONS

IEEE Transactions on Consumer Electronics vol. CE 33 No. 3 Aug. 1987 An Experimental Digital VTR Capable of 12–Hour Recording, Yamamitsu et al.

SM PIE Journal, May 1989, DPCM Bit–Rate Reduction for Component TV Signals at ENG Levels, Aubry et al.

(List continued on next page.)

*Primary Examiner*—Andrew L. Sniezek
*Attorney, Agent, or Firm*—Fitzpatrick, Cella, Harper & Scinto

[57] ABSTRACT

An information transmission system using data compression and/or error detection includes an information compression circuit for compressing digital information to generate compressed information. A record/reproducing device is provided for recording the compressed information on a recording medium, and reproducing the compressed information from the recording medium. Transmission circuitry is provided for transmitting the compressed information reproduced from the record/reproducing device to a transmission channel without expanding the compressed information. An information expansion circuit is then provided for expanding the compressed information which has been transmitted through the transmission channel in order to reproduce the digital information.

30 Claims, 9 Drawing Sheets

OTHER PUBLICATIONS

"Systems Engineering Considerations in the All Digital Television Production and Transmission Centre", IBA Technical Review, No. 16, Mar. 1982.

"VHS–C–Kamerarecorder "Video Movie"", Video–Technik, vol. 40, No. 2, Feb. 1985.

"Model A0–3–A Video Switching Equipment of Television Network", NEC Research and Developmenet, No. 62, Jul. 1981, pp. 49–56.

Patent Abstracts of Japan, Shigeyuki, VTR Incorporating with Camera, Jan. 31, 1985 Publication # 60–019372.

Patent Abstracts of Japan, Publication # 62–142486, Genzo, CATV Converter Equipment, Jun. 25, 1987.

INFORMATION TRANSMISSION SYSTEM USING DATA COMPRESSION AND/OR ERROR DETECTION

This application is a continuation of application Ser. No. 08/247,115 filed May 20, 1994, which is a continuation of Ser. No. 07/970,225 filed Nov. 2, 1992, which in turn is a continuation of application Ser. No. 07/386,714 filed Jul. 31, 1989, all now abandoned.

BACKGROUND OF THE INVENTION

1. Field of the Invention

The present invention relates to an information transmission system and more particularly to an information transmission system with a record/reproducing device.

2. Related Background Art

There are already known a digital video tape recorder for recording and reproducing digital video signals, and a system for transmitting and receiving digital video signals.

Figure 1:
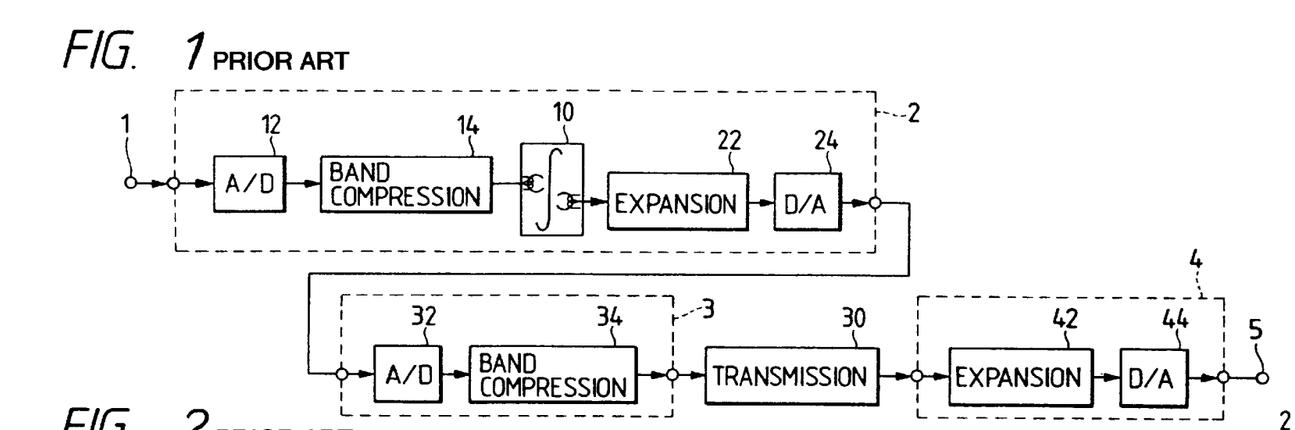
FIG. 1 is a block diagram of an example of a system for transmitting the output of a record/reproducing apparatus to a transmission channel.

Consequently a system for recording a video signal in a digital video tape recorder and transmitting the reproduced video signal after encoding can be realized by the combination of known technologies, as shown in FIG. 1. An analog video signal supplied to an input terminal 1 is entered into a video tape recorder 2. An analog video signal released therefrom is supplied to an encoder (transmitter) 3 for encoding and band compression. The output of the encoder 3 is supplied through a transmission channel 30 to a decoder 4 constituting a receiver, for signal expansion and D/A conversion. Thus, the original analog video signal is obtained at an output terminal 5.

In the video tape recorder 2, there are provided an A/D converter 12, a band compression circuit 14, an electromagnetic converting unit 10, an expansion circuit 22 for effecting an expansion inverse to the process of the band compression circuit 22, and a D/A converter 24. In the encoder 3 there are provided an A/D converter 32, and a band compression circuit 34 for transmission. In the decoder 4 there are provided an expansion circuit 42 for effecting an expansion inverse to the process conducted in the band compression circuit 34, and a D/A converter 44.

As an application of the above-mentioned signal transmission system, there can be conceived a system in which plural receivers with decoders can receive desired programs from plural transmitting video tape recorders (image sources) through an exchange. In such a system, the transmitting side has conventionally been composed of plural transmitters, each composed of the video tape recorder 2 and the encoder 3, and the outputs of said transmitters have been connected to said exchange.

However, in the above-explained system, an A/D conversion, and signal compression and expansion are conducted in the video tape recorder, and also in front of and behind the transmission channel 30. Such repeated processes lead to a complication in the structure, thus resulting in a longer time in assembly, a lowered reliability, an elevated cost, a larger weight and a difficulty in making the equipment compact. These drawbacks become more marked when plural transmitters and plural receivers are connected through the exchange, as there is required many groups of equipment.

Figure 2:
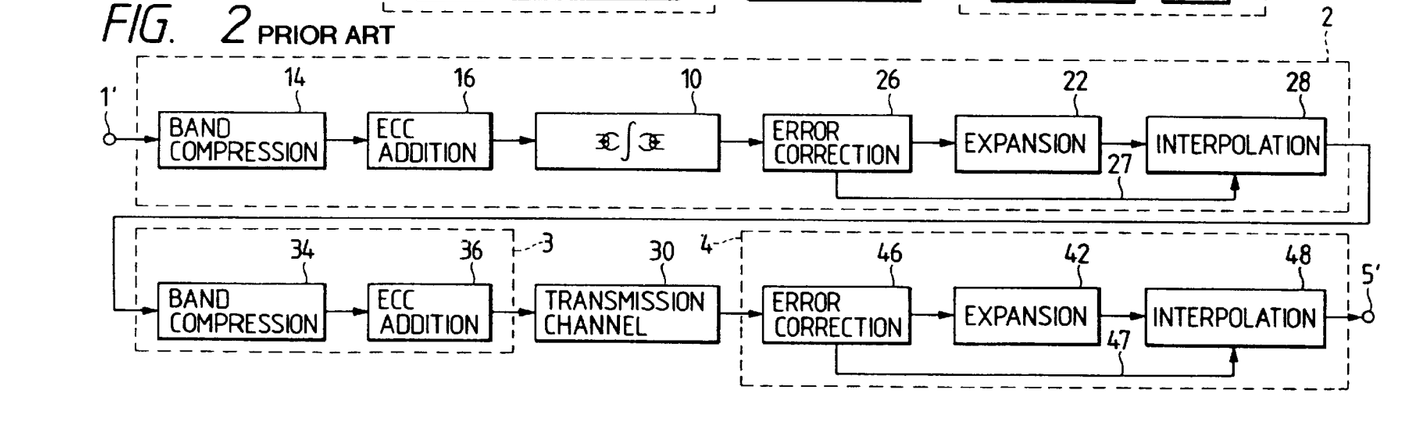
FIG. 2 is a block diagram of another system similar to that shown in FIG. 1.

FIG. 2 shows a similar system, in which the input and output of the video tape recorder, the input of the encoder and the output of the decoder are digital video signals, and in which a function of error correction in the codes is further added.

In FIG. 2, a digital video signal is subjected to a band compression in a band compression circuit 14, and is supplied to an error correction code (ECC) adding circuit 16, which adds an error correction code for detecting and correcting errors resulting from recording and reproduction. The output of the ECC adding circuit 16 is supplied to an error correction circuit 26 through an electromagnetic conversion unit 10 comprising magnetic heads and a magnetic recording medium. Said error correction circuit 26 corrects the errors caused during recording and reproduction in the electromagnetic conversion unit, utilizing the error correction code added in the ECC adding circuit 16. If correction is not possible, the error correction circuit 26 releases an interpolation flag signal 27. An expansion circuit 22 applies, to the output of the error correction circuit 26, an expansion inverse to the band compression in the band compression circuit 14, and an interpolation circuit 28 effects interpolation on the data for which correction is not possible, according to the interpolation flag 27 s et by the error correction circuit 26. The circuits 14 to 28 correspond to a digital video tape recorder 2, and the output of the interpolation circuit 28 is digital video signal.

The output of the interpolation circuit 28 is supplied to a band compression circuit 34 for transmission and is band compressed therein. Then, the error correction code for transmission is added in an ECC adding circuit 36. The band compression circuit 34 and the ECC adding circuit 36 correspond to the encoder 3.

The output data of the ECC adding circuit 36 are supplied, through a transmission channel 30, to an error correction circuit 46 of the receiving side, which corrects the error in the transmission according to the error correction code added by the ECC adding circuit 36. If the error is uncorrectable, the error correction circuit 46 releases an interpolation flag signal 47. An expansion circuit 42 applies, to the output of the error correction circuit 46, an expansion corresponding to the band compression in the band compression circuit 34, and an interpolation circuit 48 effects an interpolation on the uncorrectable data, according to the interpolation flag signal 47 from the error correction circuit 46. The circuits 46 to 48 correspond to the decoder 4, and the output of the interpolation circuit 48 is digital video signal.

In addition to the drawbacks associated with the system shown in FIG. 1, the system shown in FIG. 2 has a drawback of requiring two interpolation circuits 28, 48, as the interpolations for the errors in the electromagnetic conversion unit 10 and in the transmission channel 30 are conducted separately. Also, for interpolation in the interpolation circuit 28, the compressed data are expanded in the expansion circuit 22, and are again compressed in the band compression circuit 34 for data transmission.

Therefore the system of FIG. 2 is difficult to make compact as efficient utilization of circuits is not at all provided. Also, the repeated compressions and expansions of the video signal may result in deterioration of image quality. The possibility of such deterioration in image quality is high if the band compression method for recording is different from that for transmission, for example if a sub-sampling is conducted by a field offset method while the other is conducted by a line offset method, or if the quantizers for differential quantization have different set values.

Figure 3:
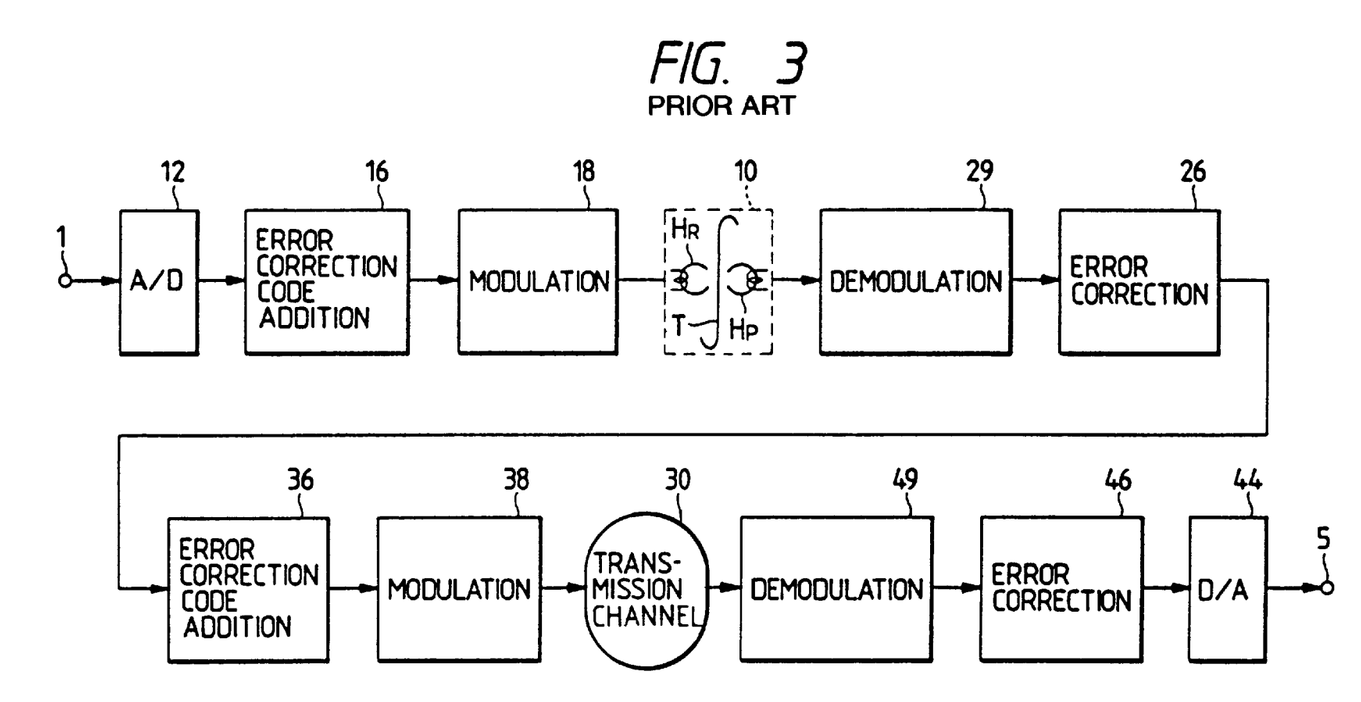
FIG. 3 is a block diagram of still another system similar to that shown in FIG. 1.

FIG. 3 shows a similar system in which band compression associated with high-efficiency encoding is not conducted. Such a system is adapted for use as an audio processing circuit in a system provided with a video processing circuit and an audio processing circuit. In the system shown in FIG.

3, an analog audio signal supplied to a terminal 1 is digitized in an A/D converter 12, and an error correction signal for correcting the error in recording and reproduction is added by an error correction code adding circuit 16. Then, said signal is modulated in a modulating circuit 18 and is recorded on a recording medium T such as a video tape, by means of a magnetic head $H_R$ (a rotary magnetic head in the case of a video tape recorder. Another magnetic head $H_P$ (magnetic head $H_R$ may also be used for this purpose) reproduces the magnetic signal from the recording medium T, and said signal is demodulated by a demodulating circuit 29. An error correction circuit 26 corrects the error in recording and reproduction, by the error correction code added by the error correction code adding circuit 16.

In the transmission of the thus reproduced signal, an error correction code adding circuit 36 adds, to the output of the error correction circuit 26, an error correction code for correction the error in the transmission, and a modulating circuit 38 effects modulation for transmission, and the signal is supplied to the transmission channel 30. A demodulating circuit 49 receives and demodulates the data transmitted through the channel 30, and an error correction circuit 48 corrects the error in transmission, by the error correction code added by the error correction code adding circuit 36. A D/A converter 44 converts the output digital signal of the error correction circuit 46 into analog signal.

Also in such system, the error corrections conducted in two stages increase the magnitude of circuitry and the cost of the system.

SUMMARY OF THE INVENTION

An object of the present invention is to solve drawbacks mentioned above.

Another object of the present invention is, in a system for transmitting the output of a record/reproducing apparatus, to make compact the magnitude of circuitry and to reduce the cost.

Still another object of the present invention is, in a system for transmitting the output of an apparatus for recording and reproducing compressed information, to prevent deterioration of said information and to reduce the magnitude of the circuits.

For attaining the above-mentioned objects, there is proposed, as an embodiment of the present invention, a system described below.

Still another object of the present invention is, in a system for transmitting the output of an apparatus for recording and reproducing information with added error correction code, to reduce the magnitude of the circuits.

For attaining the above-mentioned object, there is proposed a system described below as another embodiment of the present invention. Also proposed are systems described below in other embodiments.

Still other objects of the present invention, and the advantages thereof, will become fully apparent from the following detailed description of the embodiments.

DETAILED DESCRIPTION OF THE PREFERRED EMBODIMENTS

Now the present invention will be clarified in detail by embodiments thereof shown in the attached drawings.

Figure 4:
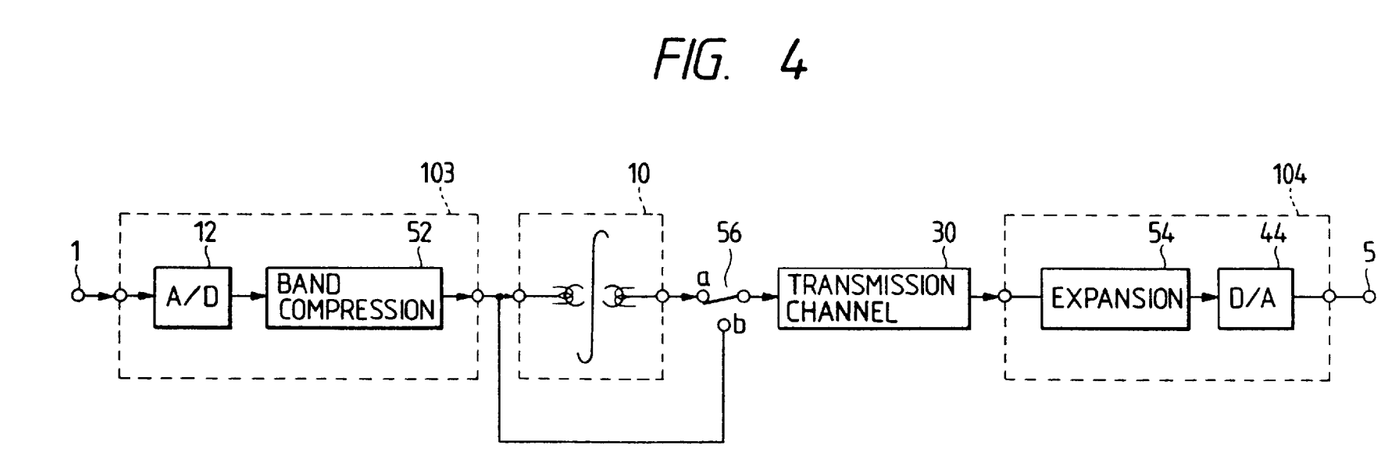
FIG. 4 is a block diagram of a system embodying the present invention.

FIG. 4 is a block diagram of an embodiment of the present invention. An analog video signal entered from an input terminal 1 is supplied to an encoder 103 for A/D conversion and band compression. The compressed output data of the encoder 103 are supplied to a digital data recorder (DDR) 10 having an electromagnetic conversion unit and are recorded on a recording medium such as a magnetic tape. Data reproduced in the DDR 10 are transmitted, through a switch 56, to a transmission channel 30. The output of the encoder 103 can be transmitted in real time to the transmission channel 30 by placing the switch 56 at a contact b. The data transmitted through the transmission channel 30 are entered into a decoder 104 for effecting a process inverse to that of the encoder 103 to obtain the original band width. Thus, an analog video signal is obtained at an output terminal 5.

In the encoder 103 there are provided an A/D converter 12 and a band compression circuit 52. In the decoder 104 there are provided an expansion circuit 54 for effecting an expansion process inverse to the process of the band compression circuit 52, and a D/A converter 44.

Figure 5:
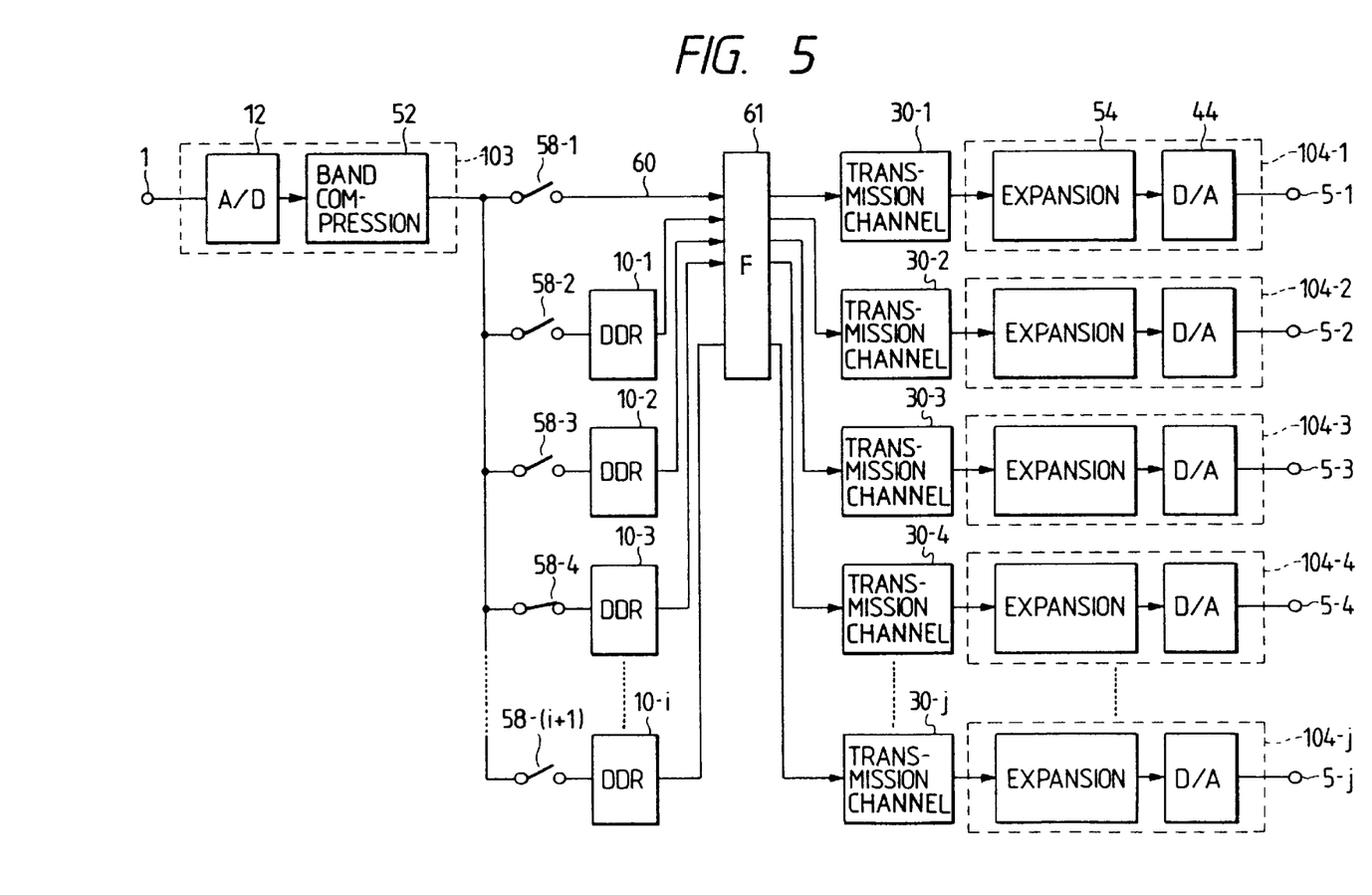
FIG. 5 is a block diagram of an application of the system shown in FIG. 4.

FIG. 5 is a block diagram of an application, based on the system shown in FIG. 4, in which plural receivers can have access to plural image sources through an exchange. There are shown an input terminal 1 for receiving an analog signal; an encoder 103 composed of an A/D converter 12 and a band compression circuit 52; digital data recorders 10-1–10-$i$; a signal line 60 bypassing the digital data recorders; switches 58-1–58-($i$+1) for supplying the output of the encoder 103 to the digital data recorders 10-1–10-$i$ and the signal line 60; an exchange switch 61 having an exchange function; transmission channels 30-1–30-$j$; and decoders 104-1–104-$j$ each having an expansion circuit 54 and a D/A converter 44.

In the structure shown in FIG. 5, the compressed data obtained by A/D conversion and data compression in the encoder 103 are recorded in a desired one of the digital data recorders 10-1–10-$i$ or directly supplied to the exchange switch 61 through the signal line 60 by means of the switches 58-1–58-($i$+1). The receivers having the decoders 104-1–104-$j$ have access to digital data recorders 10-1–10-$i$ having a desired program, or data through the transmission channels 30-1–30-$j$ and the exchange switch 61 to receive said data. Said data are expanded by the expansion circuit 54 and converted into an analog signal by the D/A converter 44 to provide an analog video signal.

The recording medium of the digital data recorders can be composed of magnetic tape, magnetic disk, optical disk, magnetooptical disk etc.

As will be easily understood from the foregoing, the systems shown in FIGS. 4 and 5 avoid repetition of band compression and expansion in the signal transmission and simplify the structure, thereby facilitating the assembly of the circuit, and improving the reliability thereof. Also, there can be realized cost reduction, weight reduction and the device may be made compact.

Figure 6:
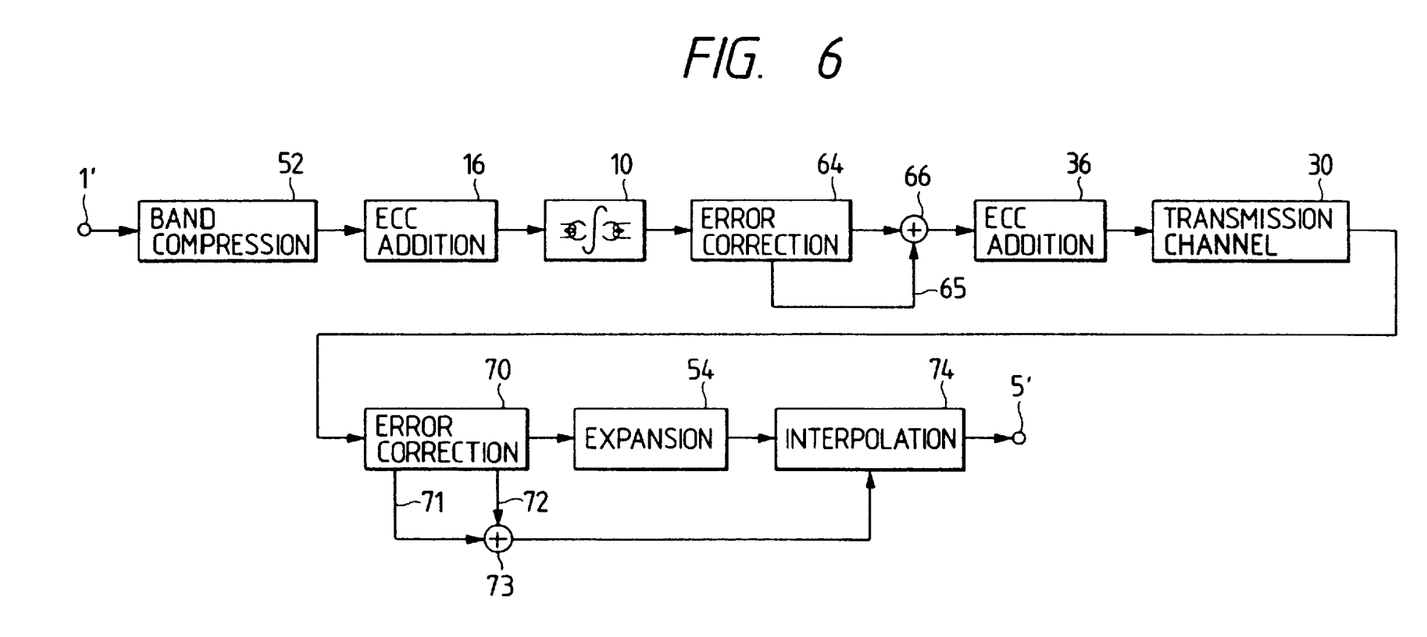
FIG. 6 is a block diagram of another embodiment of the system of the present invention.

FIG. 6 is a block diagram of another embodiment of the present invention, wherein the same components as those in FIGS. 2 and 4 are represented by the same numbers. The band compression circuit 52 is the same as that shown in FIG. 4, and the ECC adding circuit 16 and the electromagnetic conversion unit 10 are the same those shown in FIG. 2. The output of the electromagnetic conversion unit 10 is supplied to an error correction circuit 64, which corrects error in the recording and reproduction in the electromagnetic conversion unit according to the error correction code added in the ECC adding circuit 16, or releases an interpolation flag signal 65 for uncorrectable data. An addition circuit 66 adds an interpolation flag signal 65, for example, behind every data of a predetermined amount released from the error correction circuit 64. The ECC adding circuit 36 adds an error correction code to the data from the addition circuit 66 and sends said data to the transmission channel 30.

In the receiving side, the data transmitted through the transmission channel is supplied to an error correction circuit 70, which corrects the error in transmission utilizing the error correction code added in the ECC adding circuit 36. The error correction circuit 70 generates an interpolation signal 71 corresponding to the interpolation flag signal 65, and another interpolation flag signal for uncorrectable data. Said interpolation flag signals 71, 72 are supplied to an addition circuit 73, which functions logically as an OR circuit, and, if either of said interpolation flag signals 71, 72 indicates the necessity of interpolation, sends said flag signal to an interpolation circuit 74.

The expansion circuit 54 applies, to the output data of the error correction circuit 70, an expansion process corresponding to the band compression in the band compression circuit 52. The interpolation circuit 74 effects an interpolation on the output of the expansion circuit 54, according to the output of the addition circuit 73.

Since the error rate in the transmission channel 30 is usually very small, the interpolation flag signal from the error correction circuit 64 scarcely generates an error in the transmission through the channel 30, so that the deterioration of image quality resulting from such error is negligible.

As will be apparent from the foregoing description, the system shown in FIG. 6 requires only single interpolation, band compression and expansion circuits. It is consequently possible to make compact the entire system and to reduce the weight thereof.

Figure 7:
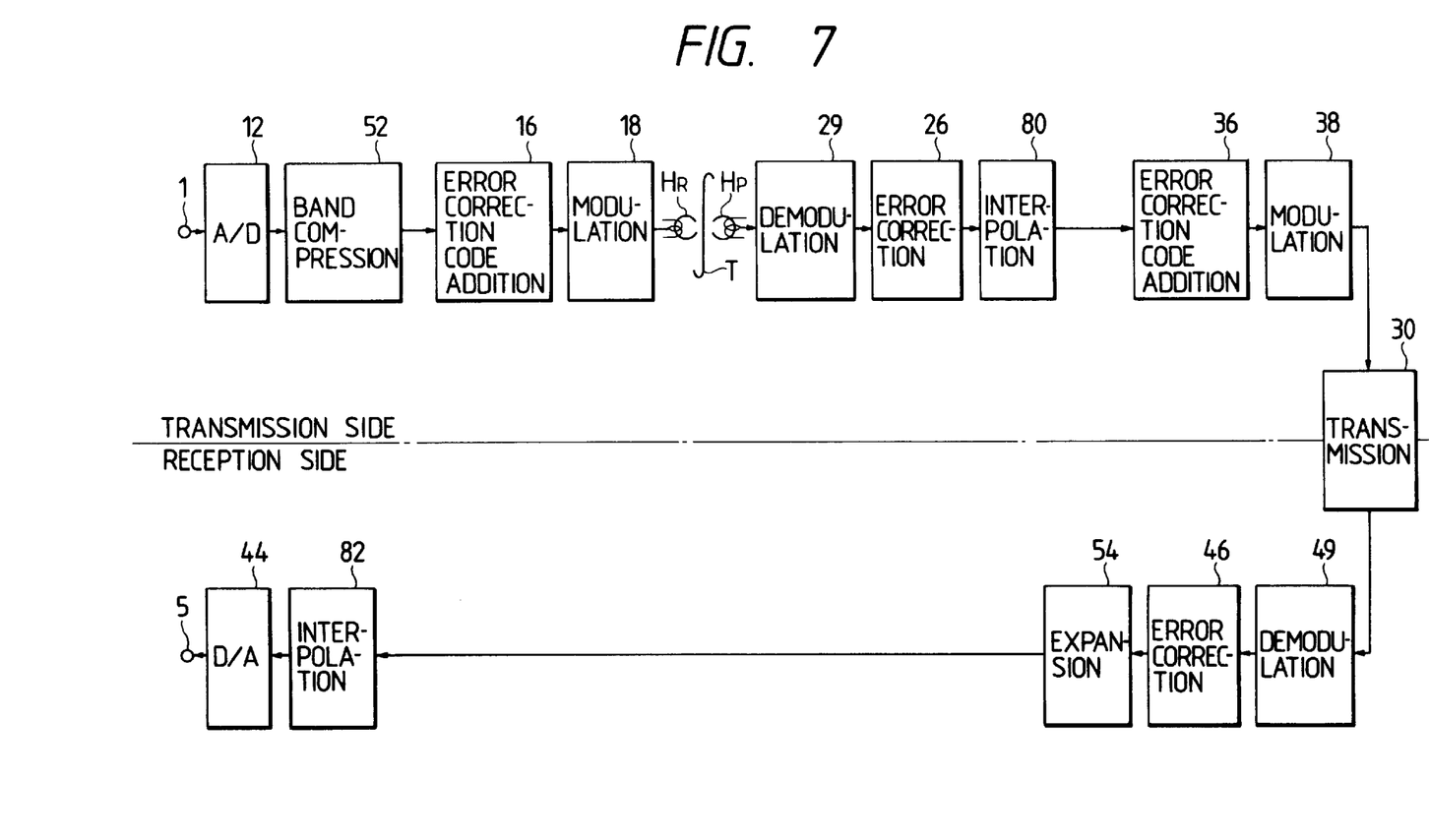
FIG. 7 is a block diagram of still another embodiment of the system of the present invention.

FIG. 7 is a block diagram of still another embodiment of the present invention, wherein analog video signal is supplied to an input terminal 1 and is digitized in an A/D converter 12. A band compression circuit 52 compresses the output data (digital video signal) of the A/D converter 12 by sub-sampling, differential encoding etc. to reduce the quantity of data. An error correction code adding circuit 16 adds an error correction code to the output data of the band compression circuit 52. Then, a modulating circuit 18 effects digital modulation for example by a scramble NRZ method, and the output thereof is recorded by a magnetic head $H_R$ on a magnetic tape T.

The signal recorded on the magnetic tape T is reproduced by a magnetic head $H_P$, and is demodulated by a demodulating circuit 29. An error correction circuit 26 effects error correction according to the error correction code added in the error correction code adding circuit 16 to provide a compressed video signal. In a simple combined system, the output of the error correction circuit 26 is expanded by an expansion circuit, but, in the present embodiment, the output of the error correction circuit 26 is directly supplied to an interpolation circuit 80 for effecting interpolation on the data that have not been corrected in said error correction circuit 26. The interpolation circuit 80 provides necessary data by intra- or interframe interpolation. The interpolation of the compressed signal is not necessarily easy for certain compression methods, but some interpolations are quite easy such as line interpolation for a differential digitized signal, and there can be selected suitable combinations of compression and interpolation.

The output of the interpolation circuit 80 is supplied then to a processing system for transmission. Thus, an error correction code adding circuit 36 adds an error correction code for transmission, and a modulating circuit 38 executes modulation for transmission. Thus, the output of the modulating circuit 38 is transmitted to the transmission channel 30, composed for example of an optical fiber or a communication satellite. The signal transmitted by the transmission channel 30 is demodulated by a demodulating circuit 49 of the receiving side, and an error correction circuit 46 effects error correction utilizing the error correction code added by the error correction code adding circuit 36. Then, an expansion circuit 54 effects an expansion process corresponding to the process of the band compression circuit 52, thereby obtaining a digital video signal. An interpolation circuit 80 executes interpolation on a part not corrected by the error correction code from the error correction code adding circuit 36. A D/A converter 44 converts the output data of the interpolation circuit 82 to an analog signal, which is released from an output terminal 5.

In the embodiment shown in FIG. 7, the signal reproduced from a magnetic tape T constituting the recording medium is subjected, without expansion, to interpolation in the interpolation circuit 80, then added with the error correction code for transmission and is sent to the transmission channel 30. Thus the signal is transferred in the compressed state from the record/reproducing system to the transmission channel, so that the image quality deterioration resulting from repeated compressions and expansions can be prevented.

Figure 8:
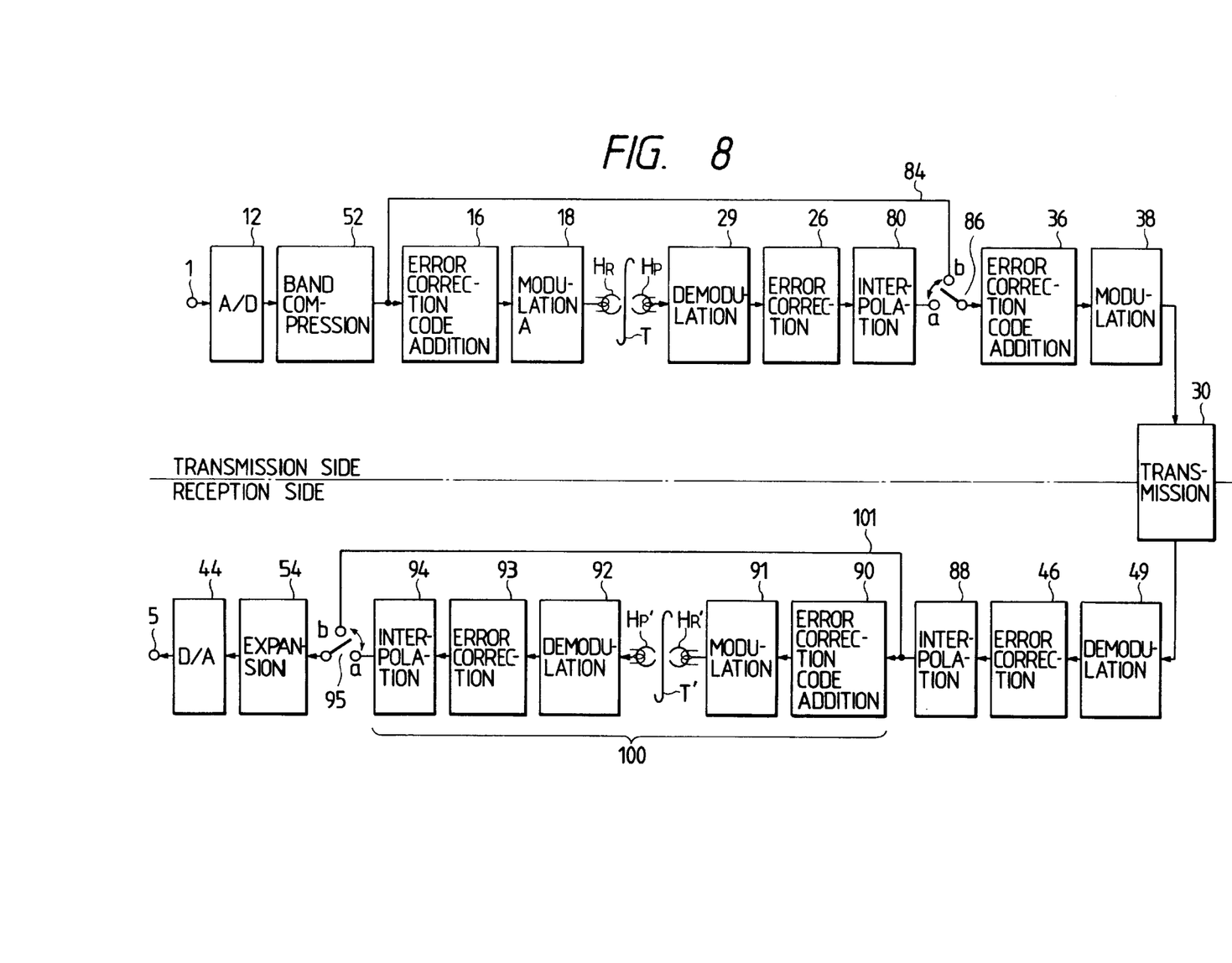
FIG. 8 is a block diagram of still another embodiment of the system of the present invention.

FIG. 8 is a block diagram of still another embodiment of the present invention, wherein the same components as those in FIG. 7 are represented by the same numbers. In the present embodiment, in the transmitting side, the record/reproducing system of the matnetic tape T can be bypassed by a bypass 84 and a selector switch 86. In the receiving side, the output of the error correction circuit 46 is supplied to an interpolation circuit 88 for effecting at first the interpolation of the uncorrectable data, and the output thereof is supplied either to a record/reproducing system 100 or a bypass 101, selected by a switch 95. The output thereof is supplied to the expansion circuit 54 for effecting expansion corresponding to the band compression in the band compression circuit 52. The record/reproducing system 100 is composed of an error correction code adding circuit 90; a modulating circuit 91; a recording head $H_R'$; a magnetic tape T'; a reproducing head $H_P'$; a demodulating circuit 92; an error correction circuit 93; and an interpolation circuit 94, and functions in the same manner as the record/reproducing system of the transmitting side. That is, in case a transceiver circuit (which has both functions of transmitting and receiving shown in the figures) is employed, one record/reproducing system can be used. If the switch 86 is positioned at the contact a in the embodiment shown in FIG. 8, the function is the same as that of the transmitting side of the embodiment shown in FIG. 7. If said switch 86 is positioned at the contact b, the signal from the input terminal 1 is transmitted, on a real-time basis, to the transmission channel 30.

On the other hand, in the receiving side, at first the interpolation circuit 88 effects interpolation on the data that have been uncorrectable in the error correction circuit 46. If the switch 95 is positioned at the contact b, the output of the interpolation circuit 88 is expanded in the expansion circuit 54 and is converted into an analog signal by the D/A converter 44. If the switch 95 is positioned at the contact a, the output of the interpolation circuit 88 is once recorded on the magnetic tape T'. Such interpolation on the compressed video signal avoids the repetition of the compression and expansion even when the received signal is once recorded on the recording medium.

The embodiment shown in FIG. 8 allows four modes of use by the combinations of the switches 86 and 95.

In FIGS. 7 and 8 there is employed each one unit of the magnetic heads $H_R$, $H_P$, $H_R'$ and $H_P'$, but there may be employed plural units for each, or the recording head and the reproducing head may be combined. Also, there may be employed rotary heads as in a video tape recorder. Furthermore, the magnetic tape may be replaced by a magnetic disk or an optical disk.

As will be easily understandable from the foregoing explanation, the systems shown in FIGS. 7 and 8, being free from repetition of signal compression and expansion at the record/reproducing and transmission of the data, enables a simplification of the system structure, cost reduction, simplification and lower power consumption, and prevents unnecessary deterioration in the signal quality.

Figure 9:
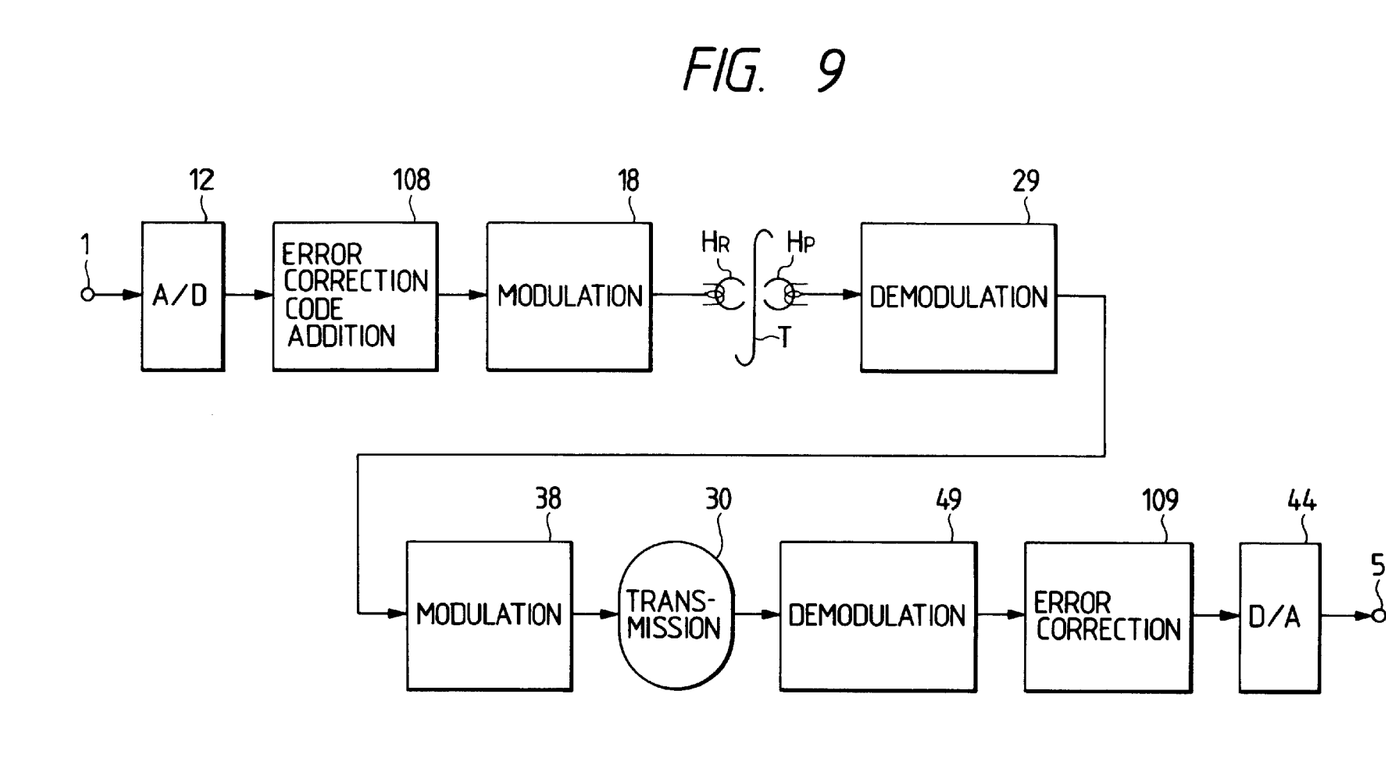
FIG. 9 is a block diagram of still another embodiment of the system of the present invention.

FIG. 9 is a block diagram of still another embodiment of the system of the present invention for record/reproduction and transmission of an information signal, wherein shown are an A/D converter 12; an error correction code adding circuit 108 for adding code of a higher correcting ability than that of the error correction code used for correcting transmission errors, such as a DEC code for correcting two vertical directions and SEC/DED code for correcting one horizontal direction (one correction/two detections); a modulating circuit 18 for recording on a recording medium; a recording magnetic head $H_R$; a recording medium T such as a video tape or a magnetic disk; a reproducing magnetic head $H_P$; a demodulating circuit 29 corresponding to the modulating circuit 18; a modulating circuit 38 for transmission; a transmission channel 30; a demodulating circuit 49 corresponding to the modulating circuit 38; an error correction circuit 109 for effecting error correction according to the error correction code added by an error correction code adding circuit 108; and a D/A converter 44.

The embodiment shown in FIG. 9 functions in the following manner. The A/D converter 12 digitizes the analog audio signal, and the error correction code adding circuit 108 adds an error correction code capable of correcting error in the transmission in the transmission channel 30. The data with the thus added error correction code are recorded on the recording medium T through the modulating circuit 18 and the magnetic head $H_R$, and the reproduced output of the magnetic head $H_P$ is demodulated in the demodulating circuit 29, of which the output corresponds to the output of the error correction code adding circuit 108 unless there is an error in the recording and reproduction.

The modulating circuit 38 modulates the output of the demodulating circuit 29, and sends the obtained output to the transmission channel 30. The transmitted data are demodulated by the demodulating circuit 49. The data are then corrected in the error correction circuit 109, based on the error correction code added by the error correction code adding circuit 108, and are converted into an analog signal by the D/A converter 44.

The error rate at the stage of the input to the error correction circuit 109 is estimated to be higher than that in the simple combined system, but the errors can be sufficiently corrected by the use of an error correction code of a high redundancy and a high error correcting ability in the error correction code adding circuit 108.

Figure 10:
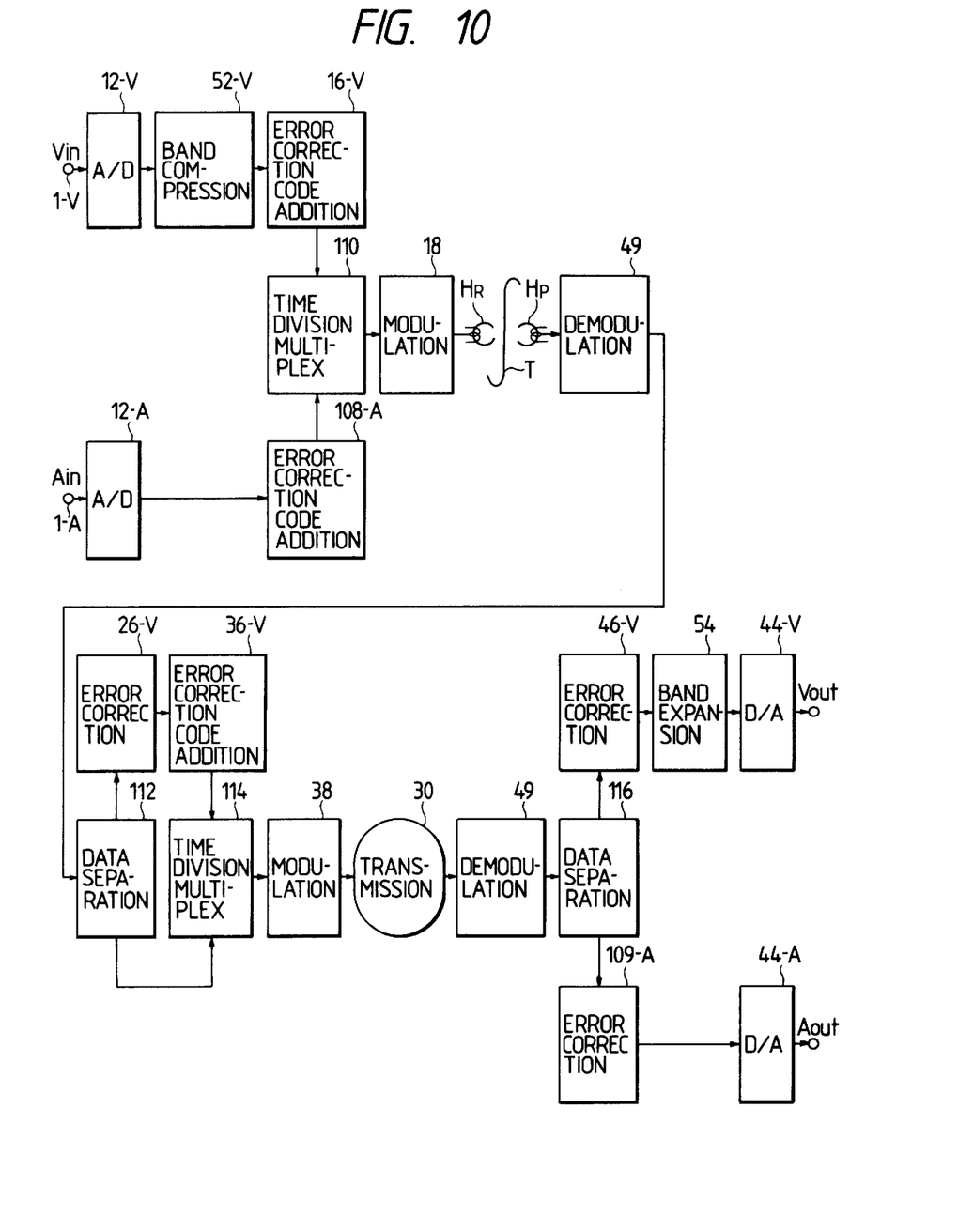
FIG. 10 is a block diagram of an application of the system shown in FIG. 9.

FIG. 10 shows an embodiment in which the system shown in FIG. 9 is applied to a system for simultaneously transmitting audio and video signals, wherein the same components as those in FIGS. 3 and 9 are represented by same the numbers, and will not be explained in detail.

Input video signal Vin and input audio signal Ain are respectively supplied to input terminals 1-V, 1-A. The video signal is digitized in an A/D converter 12-V, then subjected to band compression, such as sub-sampling for reducing the number of pixels or encoding for reducing the number of bits for each pixel, in a band compression circuit 52-V, and supplied to an error correction code adding circuit 16-V.

The video signal is given an error correction code for record/reproduction by an error correction code adding circuit 16-V, and the audio signal is given an error correction code for record/reproduction and transmission by an error correction code adding circuit 108-A. A time-divided multiplex circuit 110 effects time-divided multiplexing of the video and audio signal obtained from said adding circuits 16-V, 108-A, and the obtained multiplex signal is recorded on a recording medium T through a succeeding modulating circuit 18.

A signal reproduced from the recording medium T is demodulated in a demodulating circuit 49, then separated into the video signal and the audio signal in a data separation circuit 112, and the video signal alone is subjected to the addition of error correction codes for the error in the record/reproduction and that in the transmission, in circuits 26-V, 36-V. Said signals are then again subjected to time-divided multiplexing in a time-divided multiplex circuit 114, and are sent to the transmission channel 30 through a modulating circuit 38.

The signal transmitted through the transmission channel 30 is demodulated in a demodulating circuit 49, then separated again into the video signal and the audio signal in a data separation circuit 116, and the video signal is subjected to the correction of error in the transmission by an error correction circuit 46-V while the audio signal is subjected to the correction of error in the record/reproduction and in the transmission in an error correction circuit 109-A.

The video signal, after the error correction in the error correction circuit 46-V, is subjected to the expansion of the number of bits to the original state and the interpolation of the pixels skipped in the sub-sampling or lost by dropouts, in an expansion circuit 54. Thus, there are obtained output image signal Vout and output audio signal Aout.

The above-explained system allows a significant simplification of the circuit structure for the audio signal. The amount of data of the audio signal is increased due to the elevated redundancy, but such an increase is not a problem because the band for the audio signal is sufficiently narrower than that of the video signal. Consequently, the circuit structure can be simplified without deterioration of the quality of the image and sound.

The error correction circuit and the error correction code adding circuit for the video signal may be dispensed with as in the case of the audio signal, but this will result in a considerable increase in the amount of redundant data to be transmitted. Therefore, if the simplification of the circuit structure for the video signal is desirable, there may be employed an increased band compression in the band compression circuit 52-V.

In the foregoing embodiment, the record/reproducing system is provided in the transmitting side, but it may naturally be provided in the receiving side or in both the transmitting side and the receiving side.

As will be apparent from the foregoing description, the systems shown in FIGS. 9 and 10 employ only one error correction and can therefore achieve circuit simplification and cost reduction.

We claim:

1. An information transmitting system comprising a transmission apparatus and a plurality of receiving apparatuses, said transmission apparatus comprising:

plural reproducing means for reproducing compressed information from a plurality of recording mediums on which various digital information is compression-recorded; and transmission means for selectively transmitting any one of the plurality of compressed information reproduced by said plural reproducing means to a corresponding one of said plurality of receiving apparatuses, and each of said plurality of receiving apparatuses comprising:

input means for inputting the compressed information transmitted by said transmission means; and information expansion means for expanding the compressed information inputted by said input means thereby reproducing the digital information.

2. A system according to claim 1, wherein said transmission means is adapted to transmit said compressed information selectively to plural transmission channels.

3. An information transmitting system, comprising:

information compression-coding means for compression-coding digital information to generate compression-coded information;

first error correction check code adding means for adding first error correction check codes to the compression-coded information;

record/reproducing means for recording the compression-coded information with added first error correction check codes on a recording medium, and reproducing the compression-coded information from said recording medium;

first error correction means for correcting recording/reproducing errors in codes of the compression-coded information, reproduced by said record/reproducing means utilizing said first error correction check codes;

first interpolation means for effecting interpolation of said reproduced compression-coded information, according to whether the correction by said first error correction means is possible or not;

second error correction check code adding means for adding second error correction check codes to the compression-coded information outputted from said first interpolation means; and transmission means for transmitting the compression-coded information with added second error correction check codes, to a transmission channel, the compression-coded information being transmitted to said transmission channel without being decoded.

4. A system according to claim 3, further comprising:

second error correction means for correcting transmission errors in codes of the compression-coded information transmitted through said transmission channel, utilizing the second error correction check codes.

5. A system according to claim 4, further comprising:

information decoding means for decoding the compression-coded information transmitted through said transmission channel thereby restoring the digital information; and second interpolation means for effecting interpolation of the digital information restored by said information decoding means, according to whether the correction by said second error correction means is possible or not.

6. A system according to claim 4, further comprising:

second interpolation means for effecting interpolation of the compression-coded information outputted from said transmission channel, according to whether the correction by said second error correction means is possible or not, information decoding means for decoding the compression-coded information outputted from said second interpolation means thereby restoring the digital information.

7. An information transmitting system, comprising:

first error correction code adding means for adding first error correction codes to digital information;

record/reproducing means for recording digital information with the added first error correction check codes on a recording medium, and reproducing said digital information from said recording medium;

first error correction means for correcting record/reproducing errors in codes of the digital information reproduced by said record/reproducing means utilizing said first error correction check codes, and for generating first flag information in response to the generation of an uncorrectable code;

addition means for adding the first flag information to the digital information corrected by said first error correction means;

second error correction check code adding means for adding second error correction check codes to the digital information outputted by said addition means; and transmission means for transmitting the digital information with the added second error correction check codes to a transmission channel.

8. A system according to claim 7, further comprising:

second error correction means for correcting transmission errors in codes of the digital information transmitted through said transmission channel, utilizing the second error correction check codes, and adapted for generating second flag information in response to the generation of an uncorrectable code; and interpolation means for effecting interpolation of the digital information subjected to the correction of code errors in said second error correction means, according to the second flag information and also according to the first flag information transmitted through said transmission channel.

9. An information transmitting system, comprising:

first error correction check code adding means for adding first error correction check codes to video information;

second error correction check code adding means for adding second error correction check codes to audio information;

record/reproducing means for reproducing, on a recording medium, the video information with the added first error correction check codes and the audio information with the added second error correction check codes, and reproducing the video information and the audio information from said recording medium;

first error correction means for correcting record/reproducing errors in the video information reproduced by said record/reproducing means, utilizing the first error correction check codes;

third error correction check code adding means for adding third error correction check codes to the video information outputted from said first error correction means; and transmission means for transmitting, to a transmission channel, the audio information with the added second error correction check codes and the video information with the added third error correction check codes.

10. A system according to claim 9, further comprising:

second error correction means for correcting record/reproducing and transmission errors in codes of the audio information transmitted through said transmission channel, utilizing said second error correction check codes; and third error correction means for correcting transmission errors in codes of the video information transmitted through said transmission channel, utilizing said third error correction check codes.

11. A system according to claim 10, further comprising:

compression means for compressing video information to be supplied to said first error correction check code adding means; and expansion means for expanding the video information outputted from said third error correcting means, by a process corresponding to that of said compression means.

12. An information processing apparatus, comprising:

error correction check code adding means for adding error correction check codes to digital information;

record/reproducing means for recording digital information with the added error correction check codes on a recording medium, and reproducing the digital information from said recording medium;

error correction means for correcting record/reproducing errors in codes of the digital information, reproduced by said record/reproducing means, utilizing said error correction check codes, and for generating flag information in response to the generation of an uncorrectable code; and addition means for adding the flag information to the digital information corrected by said error correction means.

13. An information processing apparatus, comprising:

information compression-coding means for compression-coding digital information to generate compression-coded information;

error correction check code adding means for adding error correction check codes to the compression-coded information;

recording/reproducing means for recording the compression-coded information with the error correction check codes on a recording medium, and reproducing the compression-coded information with the error correction check codes from said recording medium;

error correction means for correcting error codes of the compression-coded information, reproduced by said recording/reproducing means, utilizing the error correction check codes;

error concealing means for concealing error codes of the compression-coded information which are included in the compression-coded information outputted from said error correction means and are uncorrectable by said error correction means, without being decoded; and transmitting means for transmitting the compression-coded information concealed by said error concealing means.

14. An information processing apparatus comprising:

input means for inputting (i) a digital information group including digital information and a first error flag indicating an error in the digital information, and (ii) check codes for error correction of the digital information group;

error correction means for correcting an error in the digital information group by using the check codes input by said input means, and for generating a second error flag indicating a presence of an uncorrectable error when there is an uncorrectable error in the digital information group; and concealing means for concealing the digital information according to the first error flag and the second error flag.

15. An information processing apparatus comprising:

input means for inputting digital information and check codes for error correction of said digital information;

error correction means for correcting an error in said digital information by using the check codes, and for generating an error flag indicating a presence of an uncorrectable error when there is an uncorrectable error in said digital information; and transmission means for multiplexing said digital information and said error flag for transmission.

16. An information processing apparatus comprising:

input means for inputting multiplexed information in which digital information and an error flag indicating an error for said digital information are multiplexed;

error check encoding means for adding check codes for error check to the multiplexed information input by said input means; and transmission means for transmitting the multiplexed information to which the check codes have been added.

17. An information processing apparatus comprising:

input means for inputting compression-coded information and error correction check codes for error correction of the compression-coded information;

error correction means for correcting error codes of the compression-coded information, input by said input means, utilizing the error correction check code;

error concealing means for concealing error codes of the compression-coded information which are included in the compression-coded information outputted from said error correction means and are uncorrectable by said error correction means, without being decoded; and transmitting means for transmitting the compression-coded information concealed by said error concealing means.

18. A method for processing information comprising the steps of:
inputting a digital information group including (i) digital information and a first error flag indicating an error in said digital information, and (ii) check codes for error correction of said digital information group;
correcting an error in said digital information group by using the check codes input by said input step, and generating a second error flag indicating a presence of an uncorrectable error when there is an uncorrectable error in said digital information group; and
concealing the digital information according to said first error flag and said second error flag.

19. A method for processing information comprising the steps of:
inputting digital information and check codes for error correction of said digital information;
correcting an error of said digital information by using the check codes and generating an error flag indicating a presence of an uncorrectable error when there is an uncorrectable error in said digital information; and
multiplexing said digital information and said error flag for transmission.

20. A method for processing information, comprising the steps of:
inputting multiplexed information in which digital information and an error flag indicating an error for said digital information are multiplexed;
adding check codes for error check to the multiplexed information input by said input steps; and
transmitting the multiplexed information to which the check codes have been added.

21. A method for processing information comprising the steps of:
inputting compression-coded information and error correction check codes for error correction of the compression-coded information;
correcting error codes of the compression-coded information, input by said input step, utilizing the error correction check codes;
concealing error codes of the compression-coded information, which are included in the compression-coded information corrected by said error correction step and are uncorrectable by said error correction step, without being decoded; and
transmitting the compression-coded information concealed by said error concealing step.

22. An information processing apparatus comprising:
input means for inputting first digital information, first check codes for error correction of the first digital information, second digital information, and second check codes for error correction of the second digital information;
error correction means for correcting an error in the first digital information by using the first check codes; and
transmission means for transmitting, to a transmission channel, the first digital information corrected by said error correction means and the second digital information which has not been subject to an error correction process.

23. Apparatus according to claim 22, wherein the first digital information comprises a video signal, and wherein said second digital information comprises an audio signal.

24. A method for processing information comprising the steps of:
inputting first digital information, first check codes for error correction of the first digital information, second digital information, and second check codes for error correction of the second digital information;
correcting an error in the first digital information by using the first check codes; and
transmitting, to a transmission channel, the first digital information corrected by said error correction means and the second digital information which has not been subject to an error correction process.

25. Apparatus according to claim 24, wherein the first digital information comprises a video signal, and wherein the second digital information comprises an audio signal.

26. An information transmitting apparatus, comprising:
information compression means for compressing digital information to generate compressed information;
error correction check code adding means for adding error correction check codes to the compressed information;
record/reproducing means for recording the compressed information to which the error check codes are added, on a recording medium, and reproducing therefrom the compressed information;
error correction means for correcting record/reproducing errors in codes of the reproduced compressed information utilizing the error correction check codes added in said error correction check code adding means; and
transmission means for selectively transmitting (i) the compressed information generated by said information compression means and (ii) the compressed information corrected by said error correction means to an external apparatus, by using a common transmission path.

27. An information transmitting apparatus, comprising:
information compression means for compressing digital information to generate compressed information;
record/reproducing means for recording the compressed information on a recording medium, and reproducing therefrom the compressed information; and
transmission means for selectively transmitting (i) the compressed information reproduced by said record/reproducing means and (ii) the compressed information compressed by said information compression means to an external apparatus, by using a common transmission path.

28. An information transmitting method comprising the steps of:
compressing digital information to generate compressed information;
adding error correction check codes to the compressed information;
recording the compressed information to which the error check codes are added, on a recording medium, and reproducing therefrom the compressed information;
correcting record/reproducing errors in codes of the reproduced compressed information utilizing the error correction check codes added in said error correction check code adding step; and
selectively transmitting (i) the compressed information generated in said information compression step and (ii) the compressed information corrected in said error correction step to an external apparatus, by using a common transmission path.

29. An information transmitting method comprising the steps of:

compressing digital information to generate compressed information;

recording the compressed information on a recording medium and reproducing therefrom the compressed information; and selectively transmitting (i) the compressed information generated in said information compression step and (ii) the compressed information reproduced in said record/reproducing step to an external apparatus, by using a common transmission path.

30. An information processing method, comprising the steps of:

compression-coding digital information to generate compression-coded information;

adding error correction check codes to the compression-coded information;

recording the compression-coded information with the error correction check codes on a recording medium, and reproducing the compression-coded information with the error correction check codes from the recording medium;

correcting error codes of the compression-coded information, reproduced in the recording and reproducing step, utilizing the error correction check codes;

concealing error codes of the compression-coded information which are included in the compression-coded information outputted in the error correction step and are uncorrectable by the error correction step, without being decoded; and transmitting the compression-coded information concealed in said error concealing step.

* * * * *